United States Patent Office 3,525,222
Patented Aug. 25, 1970

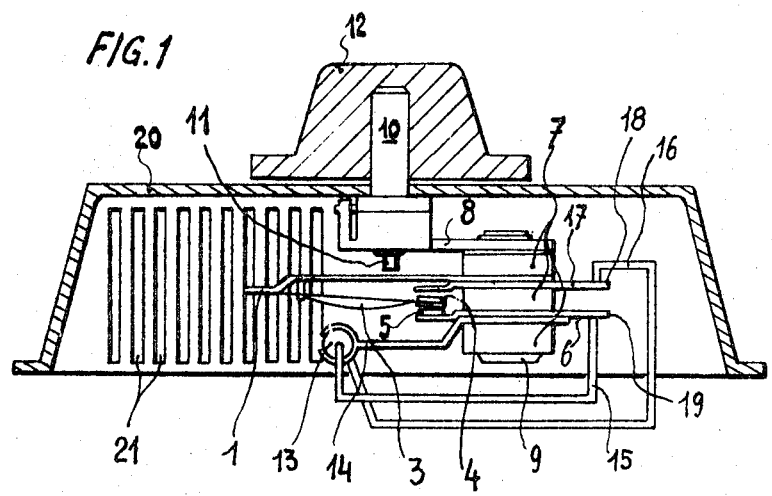
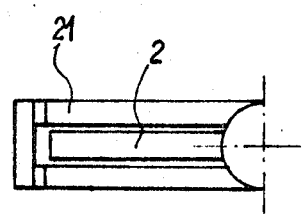
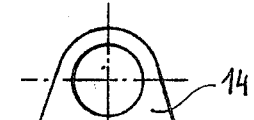
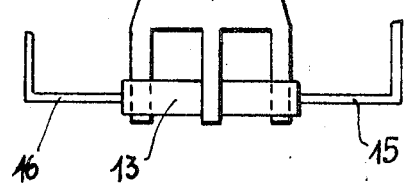
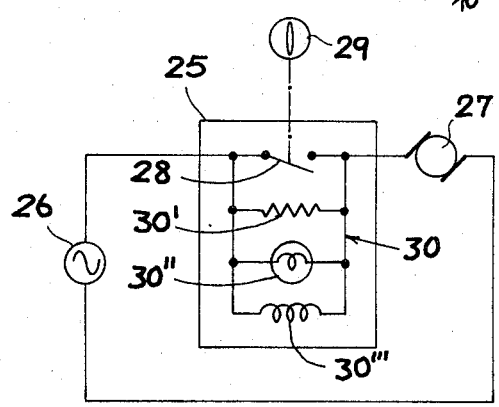

1

3,525,222
ELECTRIC TEMPERATURE REGULATOR
Peter Schüller, 4A Wilhelm-Raabe-Weg,
3006 Grossburgwedel, Germany
Filed June 11, 1968, Ser. No. 736,087
Claims priority, application Germany, June 14, 1967,
1,673,530
Int. Cl. G05d 23/30
U.S. Cl. 62—202          5 Claims

ABSTRACT OF THE DISCLOSURE

A temperature regulator for an electric refrigerator having a main freezer compartment in which the regulator is disposed and an evaporator freezer compartment to be maintained at a temperature below the temperature of the main freezer compartment, the regulator being of the bimetallic type with a pair of contacts closed when a predetermined temperature is reached in the main freezer compartment to turn on the compressor which is connected in circuit with the regulator; a heating element is bridged across the contacts and effects the bimetallic element when the contacts are open to simulate an increased demand for compressor operation.

The invention relates to an electric temperature regulator, more especially, but not exclusively for refrigerators and the like.

Refrigerators are generally regulated in such a way that the temperature of the evaporator is the sensed controlling parameter. As a result, a sensitive element which is connected via a line to a container which is subdivided into two chambers by a diaphragm, is in contact with the evaporator. The chamber communicating with the line, the line and, sometimes, the sensitive element are filled with a suitable medium, for example, a liquid or a gas. A plunger which actuates a switch contact is connected to the diaphragm.

Temperature regulators of this kind are complicated to construct and expensive to manufacture. The reason for this lies in particular in the rods, levers or other mechanisms by which the very small movements of the switch contact connected to the diaphragm have to be converted into switch movements suitable for achieving control.

Furthermore, it is known to provide elecetric temperature regulators for electric heating apparatus and the like in which actuation of a switch knob serves to deflect a bimetal tongue which is connecte dto an elastic spring and on whose one end a switch contact is arranged. In the "on" position this switch contact abuts against an associated switch contact, whereby the circuit containing the electric heating apparatus is closed.

It might, at first blush, be deemed obvious to use such a known temperature regulator on refrigeration apparatus. Usually the switching range in the main freezer compartment of a refrigerant or they will lie between +1° C. and +6° C., while the switching range in the evaporator freezer compartment will lie between —5° C. and —25° C. If the known electric temperature regulator is arranged in the main freezer compartment, then the compressor of the refrigeration unit is switched on whenever the average temperature in the main freezer compartment is less than +6° C. At this point of time, however, the temperature in the evaporator compartment has already long since exceeded the dew point, so that any ice and rime accretions are caused to melt. The temperature in these two freezer compartments have thus to some extent approached one another, which is disadvantageous and must therefore be avoided.

Here the inventive concept of the present invention is

2 relevant. An object of the invention is to provide means by which, despite the electric temperature regulator being in the main freezer compartment, during stoppage of the compressor an average temperatuer in the evaporator freezer compartment of, for example, approximately —5° C. is at all times maintained; the danger is thus avoided of the dew point in the evaporator freezer compartment being exceeded. In accordance with the invention this object is achieved in that, associated with the bimetal element, there is a heat source which is adapted to generate heat in the open condition of the two switch contacts but which is inoperative in the closed condition of the two switch contacts.

In a development of the invention an electric heat source, for example, an electric heating spiral, an ohmic resistor or an incandescent lamp is provided as the heat source.

In accordance with a further feature of the invention in the case of the electric temperature regulator having an electric heat source designed as an ohmic resistor, this resistor is mounted in a fingered saddle-like mounting support.

The heat source, which is in operation during the stoppage of the compressor of the refrigeration unit, simulates a requirement for refrigeration, so that the electric temperature regulator switches and the compressor is started up thereby in such a way that at all times an average temperature of, for example, about —5° C. is maintained in the evaporator freezer compartment.

One exemplified embodiment of the electric temperature regulator in accordance with the invention will be described in somewhat greater detail, with reference to the accompanying diagrammatic drawings in which:

FIG. 1 is a sectional elevation of the electric temperature regulator in accordance with the invention;

FIG. 2 is a top plan view of the bimetal element of the electric temperature regulator of FIG. 1;

FIG. 3 is a top plan view of the mounting support of an ohmic resistor of the electric temperature regulator of FIGS. 1 and 2; and FIG. 4 is a circuit diagram illustrating the principles of this invention.

The illustrated electric temperature regulator comprises a bimetal element 1, 2 of which a tongue 2 is mounted to one side. This tongue 2 is in the form of or incorporates a prestressed elastic spring, and has a switch contact 4 mounted on one end thereof.

Associated with the switch contact 4 there is a switch contact 5, which is mounted on a terminal lug 6. The two switch contacts 4 and 5 are electrically insulated from each other by insulation 7 preferably consisting of ceramic disks.

Denoted by numeral 8 is a mounting strap which is combined with the insulation 7, the bimetal element 1, 2 and the tab 6 into a single constructional unit by a tubular rivet 9.

The mounting strap 8 has extending therethrough a rotary spindle 10, which terminates at its lower end in a plunger 11, which confronts the tongue 2 of the bimetal element 1, 2. A switch knob 12, with which the desired temperature in the main freezer compartment can be set, is connected to this spindle.

In accordance with an essential feature of the invention, associated with the bimetal element 1, 2 there is a heat source, which is in operation in the open condition of the two switch contacts 4, 5 but which is inoperative in the closed condition of the two switch contacts 4, 5. The expression "heat source" is to be understood in the widest sense of the word. For example, an electric heat source in the form of an electric heating spiral or an incandescent lamp can be understood thereby. In the case of the embodiment illustrated in the drawings an ohmic resistor 13, which lies adjacent or in the vicinity of the bimetal element 1, 2, is provided as the heat source. This ohmic resistor 13 is mounted in a fingered saddle-like mounting support 14 (FIG. 3).

The fingered saddle-like mounting support 14 consists of three fingers or tongues, of which the two external tongues engage under the ohmic resistor 13, whilst the central tongue engages over this latter. The ohmic resistor 13 is connected via leads 15, 16, with two electrical tabs 6, 17. As is evident from FIG. 1, the fingered saddle-like mounting support 14 is clamped between the tab 6 and the lower insulation 7.

The front end of the tab 17 is designed as a stop for abutment by the contact 4, and current is supplied to the electric temperature regulator is effected via electrical connections 18, 19.

Reference numeral 20 denotes a housing for the electric temperature regulator air insulation slots 21 being formed in such housing 20.

Twisting of the switch knob 12 serves to vary the deflection of the tongue 2 of the bimetal element 1, 2 and thereby varies also the instant at which the regulator will switch on when the switch contacts 4, 5 are in the open condition, so that the compressor of the refrigeration unit is out of operation, the ohmic resistor 13 is energized. By this means, a need for refrigeration is simulated, which causes the electric temperature regulator to switch, and the compressor to be brought into operation, so that the heat removal is resumed. By this means it is ensured that, despite the position of the electric temperature regulator in the main freezer compartment, an average temperature, of for example, about −5° C. is maintained in the evaporator freezer compartment. Exceeding of the dew point in the evaporator freezer compartment is, therefore, also thereby safely prevented (with safety).

In FIG. 4, I show a temperature regulator 25 of the character described which is connected in circuit with the line source 26 and the motor 27 of the compressor, the regulator having a bimetallic switch 28 adjustable by the dial 29. The resistive heating element represented at 30 is connected in shunt across the switch 28 and is cut out when switch 28 closes but provides a sufficiently high resistance to preclude operation of the compressor motor 27 when the switch 28 is opened. When the compressor 27 is cut off, therefore, the heat from member 30 operates switch 28 prematurely, thereby simulating need for refrigeration and causing the temperature regulator to maintain the compressor in an "on"-condition even when the main freezer compartment has reached the cut-off temperature so as to bring the evaporator-freezer compartment to the low temperature mentioned earlier. It will be understood that FIG. 4 is a simplified circuit and that generally a relay will be operated by the regulator and this relay, in turn, will operate the compressor. Element 30 may be a high-ohmic resistor 30′, an incandescent lamp 30″ or an electric heating coil 30‴, as mentioned earlier.

The improvement described and illustrated is believed to admit of many modifications within the ability of persons skilled in the art, all such modifications being considered within the spirit and scope of the invention except as limited by the appended claims.

I claim:

1. An electric temperature regulator for a refrigeration system having a main compartment receiving the regulator, a second compartment to be maintained at a temperature below that of the main compartment, and a compressor electrically controlled by said regulator for cooling said compartments, said regulator comprising a pair of switch contcats electrically connectable to operate said compressor in a closed position of said contacts, a bimetallic element connected with one of said contacts and responsive to the temperature in said main compartment for biasing said one of said contacts into engagement with the other of said contacts upon a temperature rise beyond a predetermined level, a heat source including a resistor generating heat in the open position of said contacts but inoperative in the closed position thereof for maintaining the temperature in said second compartment below a predetermined level, housing means including said contacts and said resistor and disposed in said main compartment while being provided with openings communicating between the interior of said housing means and said main compartment to allow said element to sense the temperature in said main compartment, support means in said housing means including a rivet, a plurality of insulating disks disposed along said rivets, a plurality of insulating disks disposed along said rivets and separated by said contacts, said contacts having tabs projecting beyond said disks, said bimetallic element including a metallic tongue anchored in said support means and contacting a respective one of said tabs, a bimetallic spring affixed to a free end of said tongue and extending toward said support means while carrying said one of said contacts, externally controllable setting means mounted on said housing means for adjusting the temperature at which said contacts close, and a sheet-metal mount for said resistor anchored between two of said disks and touching said other of said contacts, said mount having a plurality of fingers retaining said resistor.

2. A regulator as defined in claim 1 wherein said heat source includes an electric heating coil connected in shunt across said contacts.

3. A regulator as defined in claim 1 wherein said heat source includes an incandescent lamp connected across said contacts.

4. A regulator as defined in claim 1, wherein said setting means comprises a knob rotatably mounted on said housing means, and a plunger controlled by said knob and engageable with said tongue.

5. A regulator as defined in claim 1 wherein said fingers include a pair of outer fingers engageable with one side of said resistor and a central finger engageable with the opposite side of said resistor for resiliently retaining same.

References Cited

UNITED STATES PATENTS

| | | | |
|---|---|---|---|
| 1,757,951 | 5/1930 | Breese | 236—46 |
| 2,250,135 | 7/1941 | Lindemann | 337—377 X |
| 2,988,621 | 6/1961 | Cassidy | 337—347 X |
| 3,105,364 | 10/1963 | O'Connell | 62—202 X |

OTHER REFERENCES

| | | |
|---|---|---|
| 873,956 | 8/1961 | Great Britain. |
| 711,150 | 6/1931 | France. |

EDWARD J. MICHAEL, Primary Exmainer

U.S. Cl. X.R.

62—226; 236—68